United States Patent [19]

Blatchford

[11] Patent Number: 4,518,304
[45] Date of Patent: May 21, 1985

[54] LOAD HANDLING APPARATUS

[75] Inventor: Michael I. Blatchford, Oakhill, Nr. Shepton Mallet, England

[73] Assignee: Ralph Blatchford & Company Limited, Avon, England

[21] Appl. No.: 469,713

[22] Filed: Feb. 25, 1983

[30] Foreign Application Priority Data

Mar. 4, 1982 [GB] United Kingdom ............... 8206338

[51] Int. Cl.³ .............................................. B60P 1/54
[52] U.S. Cl. ..................................... 414/542; 212/73
[58] Field of Search ............... 414/341, 342, 344, 348, 414/542; 212/73, 75, 208; 104/106, 107, 109, 246; 105/163 R

[56] References Cited

U.S. PATENT DOCUMENTS

| 1,612,271 | 12/1926 | Edson | 104/246 |
| 3,051,419 | 8/1962 | Weiland et al. | 414/542 X |
| 4,234,287 | 11/1980 | Lassig et al. | 212/208 X |
| 4,381,839 | 5/1983 | Engler et al. | 212/208 |

FOREIGN PATENT DOCUMENTS

| 1755037 | 11/1971 | Fed. Rep. of Germany . |
| 2947955 | 7/1981 | Fed. Rep. of Germany . |
| 96600 | 3/1973 | France . |
| 2345387 | 10/1977 | France . |
| 1277001 | 6/1972 | United Kingdom . |
| 2056413 | 3/1981 | United Kingdom . |
| 2064487 | 6/1981 | United Kingdom . |

Primary Examiner—Robert G. Sheridan
Attorney, Agent, or Firm—Cushman, Darby & Cushman

[57] ABSTRACT

A load handling apparatus has two spaced telescopic pedestals mounted on a vehicle. Each pedestal has a center top member at each end of which is pivotally mounted a respective arm. The arms are each movable in a vertical plane at right angles to the length direction of the vehicle, downwardly into a stowed, inoperative position in which the arms lie alongside a pedestal. Carriages carry between them a load-supporting beam and run on trackways.

6 Claims, 5 Drawing Figures

LOAD HANDLING APPARATUS

FIELD OF THE INVENTION

This invention relates to load handling apparatus. Containerisation of goods for transport is well known and widely used, and there are already known various forms of apparatus for loading and unloading containers, for example from and to road vehicles (trucks) and rail vehicles (wagons).

DESCRIPTION OF THE PRIOR ART

In general the known forms of apparatus are somewhat complex in construction or operation (or both) and are therefore expensive to manufacture. Also some known forms of apparatus occupy considerable space so that they cannot be used for the handling and transport of containers (for example) where available space is limited. Further, if the load handling apparatus is to be used on a railway or on a public road, then its overall size in the inoperative state must be such that does not occupy more than a permitted height and width.

It is thus an object of the invention which is comparatively simple in construction and operation, which is versatile in operation, and which does not occupy more than a permitted space, so that it can be used for railway and road applications.

SUMMARY OF THE INVENTION

Although this invention is primarily concerned with the handling of containers, it is not limited to that use and may be applied to the handling of other loads. Also, although the invention will be described herein by way of example as relating to load handling apparatus including a road vehicle, it is not limited to such a vehicle and may instead apply for instance to a railway vehicle.

According to this invention load handling apparatus includes a vehicle and load moving means thereon for moving a load laterally of the vehicle, wherein the load moving means comprises two spaced load moving structures each of which has a telescopically vertically extendible pedestal and at least one arm which in operative position extends substantially horizontally outwardly from the pedestal, the arm or arms supporting a device for conveying a load in a direction laterally of the vehicle, and the or each arm being turnable downwardly in a substantially vertical plane so that in the inoperative position it is alongside a respective pedestal. Preferably each telescopic pedestal mounts at its upper end two arms, extending in the operative position oppositely from the pedestal, which arms, together with a central top member of the pedestal, form a horizontal track on which runs a carriage. Thus there will be a carriage on each of the two spaced load moving structures and a load, for example a container, will be suspended from the two carriages. Preferably also the two arms on each pedestal are hingedly mounted on the top member, and pivot downwardly about the hinge axis from the substantially horizontal operative position into the non-operative position alongside the pedestal.

BRIEF DESCRIPTION OF THE DRAWINGS

An embodiment of the invention will now be described by way of example, with reference to the drawing, in which.

DESCRIPTION OF THE PREFERRED EMBODIMENT

Figure 1:
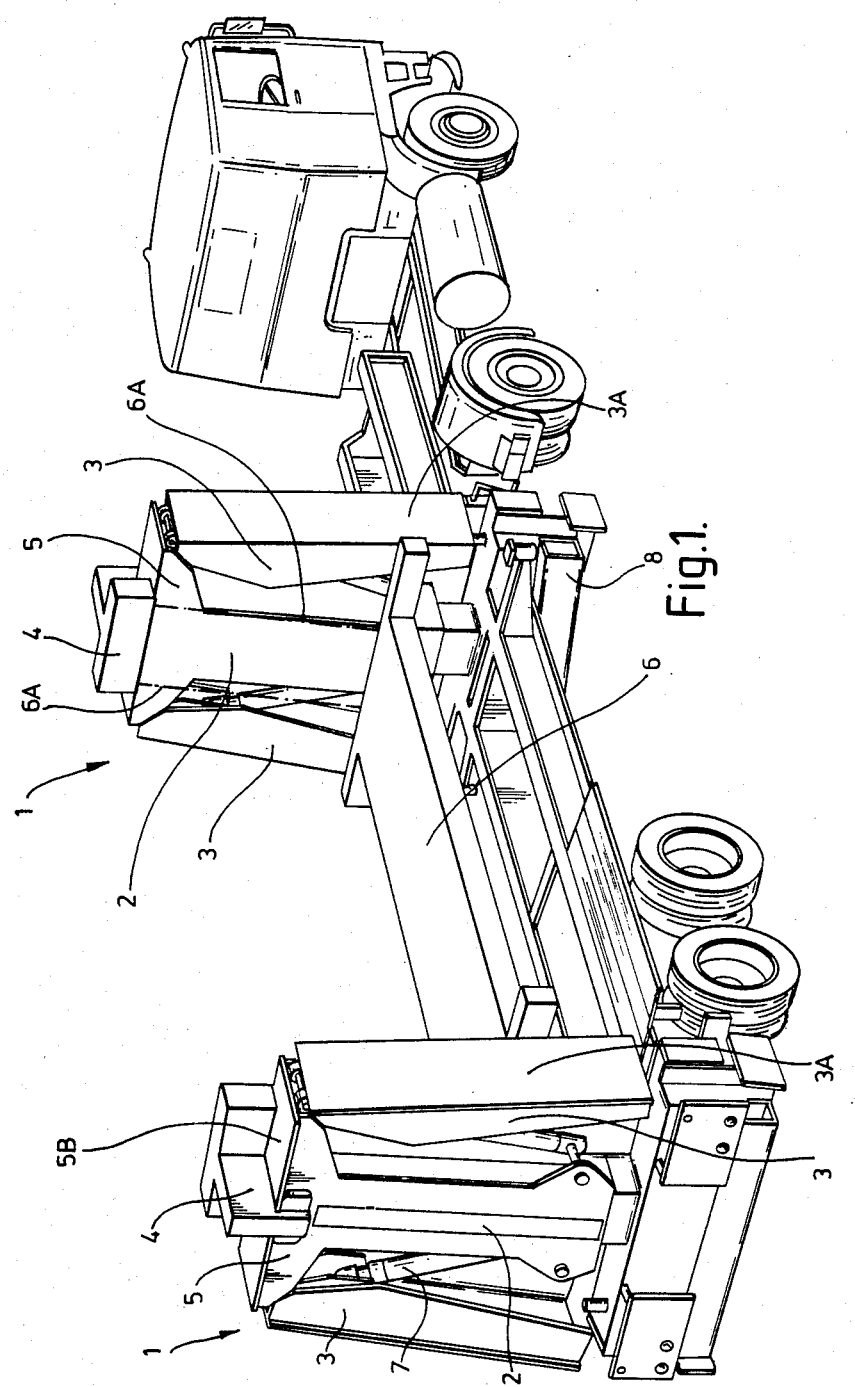
FIG. 1 is a perspective view showing load handling apparatus including a vehicle and load moving means, the latter being in the folded down, inoperative position, ready for travel along a road.

Referring to the drawings, the load handling apparatus of the invention includes a vehicle and load moving means on the vehicle for moving a load laterally of the vehicle. The load moving means comprises two spaced load moving structures 1,1, each of which has a telescopically vertically extendible pedestal 2,2 and two arms 3,3, which in operative position (FIG. 2) extend horizontally outwardly from the respective pedestal 2. The arms 3 support a carriage 4 for carrying the load in a direction laterally of the vehicle. Each arm 3 is turnable downwardly from the operative position (FIG. 2) to the inoperative position so that in the inoperative position the arms lie alongside the pedestal (FIG. 1).

Although in the present embodiment two arms 3,3 are shown on each pedestal 2, it is within the scope of the invention for each pedestal to mount only one arm, at one side of the pedestal. Such an arrangement would be in general similar to that shown diagrammatically in FIG. 4, but with the right hand arm 3 omitted.

In the present embodiment each pedestal 2 has a horizontally extending top member 5 which, together with the arms 3,3, in their operative position, provide a trackway on which runs the carriage 4. Each arm 3 is pivotally mounted at a respective opposite end 5A of the top member 5 (FIG. 3), the pivot axes (not shown) being horizontal and parallel to the length direction of the vehicle. A load carrying beam 6 extends lengthwise of the vehicle (FIG. 1) between the two pedestals 2 and is suspended at each of its ends by cables or chains 6A from a respective carriage 4, for horizontal movement of the carriages 4 and the beam 6 laterally of the vehicle, and also for vertical movement of the beam 6.

In the present embodiment each pedestal 2 has three telescopic tubular pillar sections 2A (FIG. 3), but in other embodiments fewer or more telescopic sections could be used, according to height stacking requirements.

The arms 3 are swung up and down by hydraulic rams 7, each pivotally mounted at its lower end at 7A on the upper pedestal section 2A and pivotally mounted at its upper end at 7B. The pivotal axes 7A, 7B are horizontal and parallel to the length direction of the vehicle. It will be understood that the arms 3 move up and down in a vertical plane which is at right angles to the length direction of the vehicle.

Although in the present embodiment the hydraulic rams 7 are used to move the arms 3, it is within the scope of the invention to use other mechanism for this purpose. For example, each ram could be replaced by a pair of fixed length links (not shown) one link being connected pivotally at its upper end to an arm (3) and at its lower end to the upper end of the second link. The second link would be pivotally mounted at its lower end on the upper pedestal section 2A and would be drivably movable through 180° in a vertical plane, to move the upper link and so cause the arm 3 to move in a vertical plane between its operative and inoperative positions.

Figure 3:
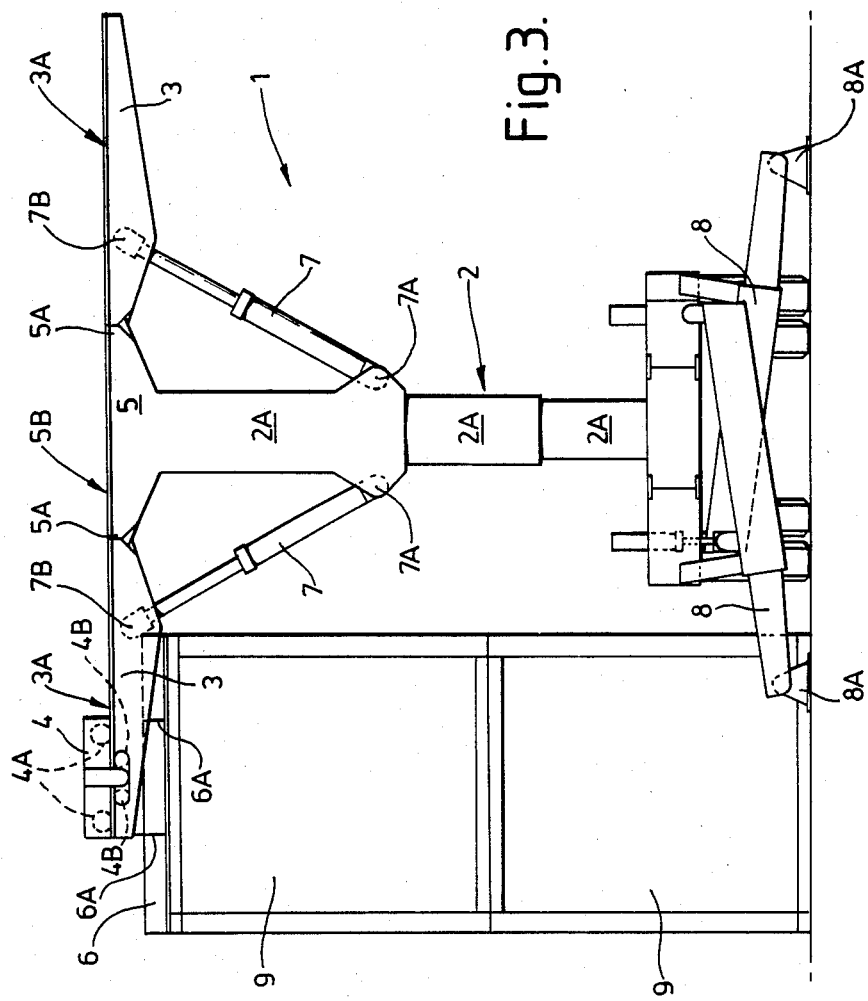
FIG. 3 is a rear elevation showing the load moving means in a second operative position.
Figure 4:
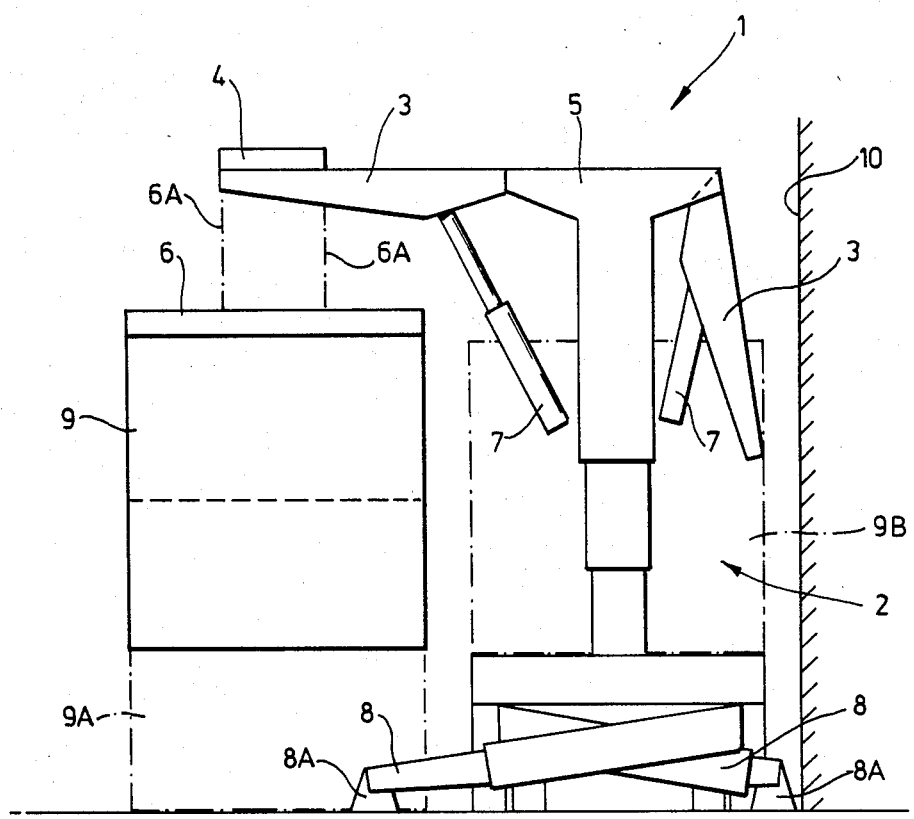
FIG. 4 is a diagrammatic rear elevation showing the load moving means in a third operative position.
Figure 5:
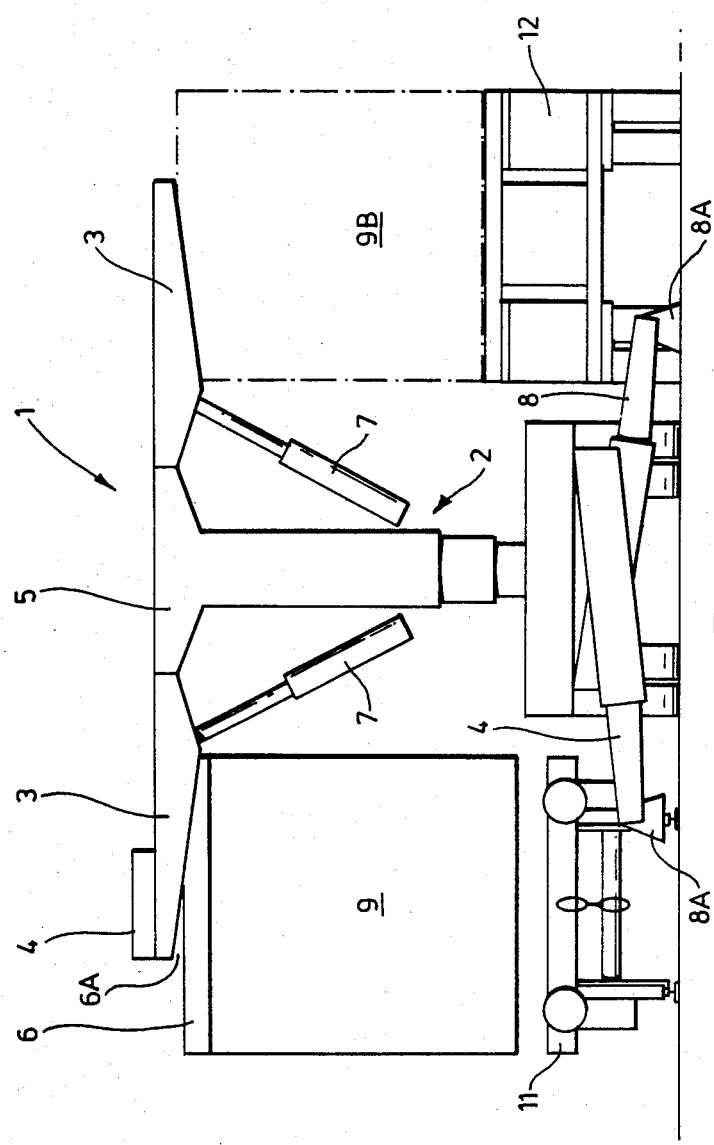
FIG. 5 is a diagrammatic rear elevation showing the load moving means in a fourth operative position.

Beneath each load moving structure 1 the vehicle mounts scissors type telescopic outriggers or stabilizers 8,8 with feet 8A, 8A, which stabilizers are lowered and extended into ground-engaging position as seen in FIG. 3. In FIG. 5 the left hand foot 8A is shown engaging one rail of a railway track. In FIG. 4 the right-hand foot 8A is shown engaging the ground nearer to the vertical centre line of the pedestal 2 than the left-hand foot 8A.

FIG. 1 shows the inoperative position of the load moving means, with the four arms 3 folded down and disposed alongside the pedestals 2. The carriages 4 are central on the respective top members 5. The load carrying beam 6 is suspended from the carriages 4 by the cables or chains 6A. The stabilizers 8 are retracted.

Figure 2:
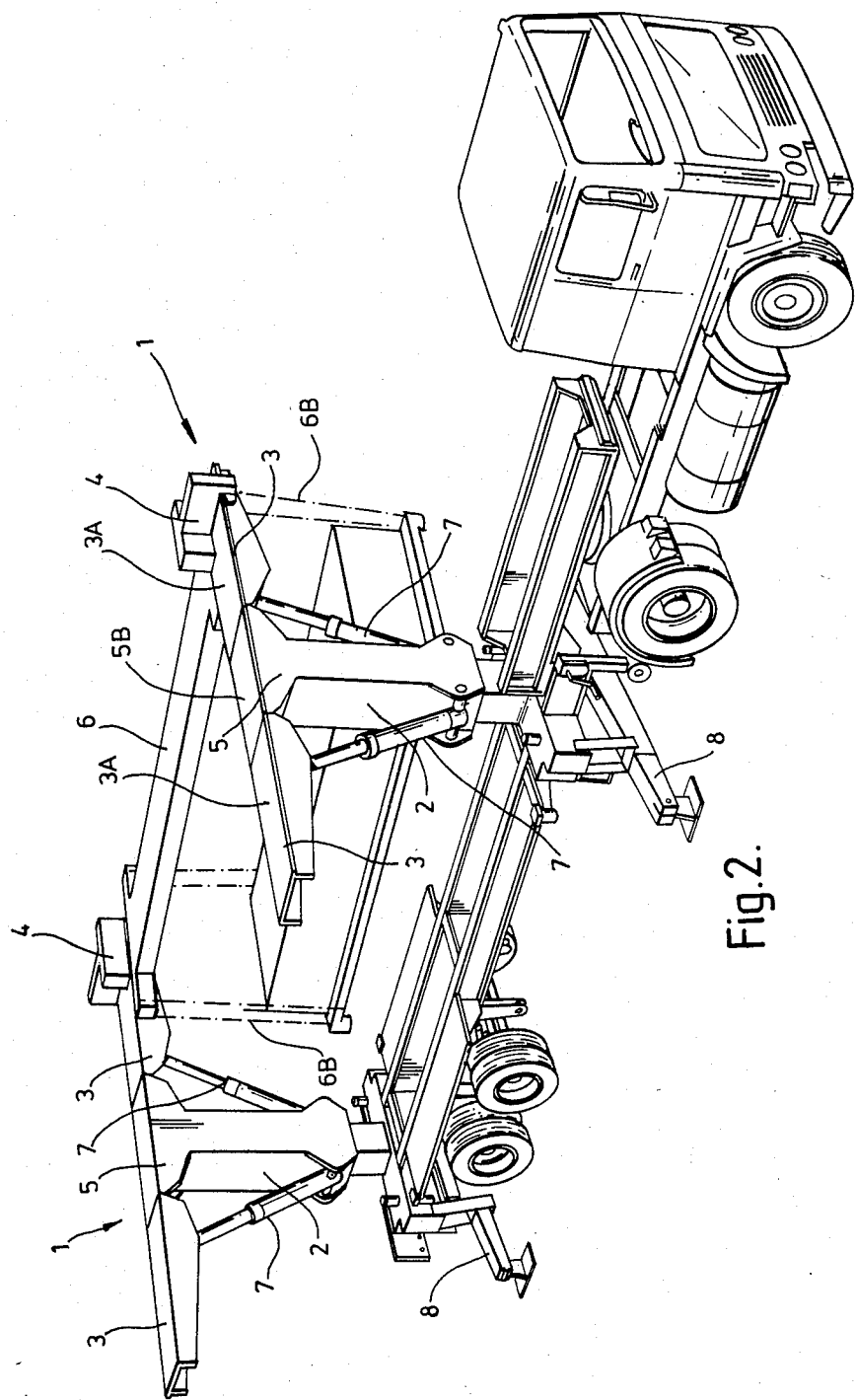
FIG. 2 is another perspective view showing the load means in a first operative position.

FIG. 2 shows one operative position, with the pedestal extended upwardly only a short distance. The rams 7 have lifted the arms 3, which together with the top members 5, make two trackways on each of which one of the carriages 4 runs. The carriages 4 are shown at the outer ends of the trackways, with the beam 6 in its uppermost position and suspending by chains 6B a platform 8 with a load 8A. It will be seen that the load 8A is suspended to one side of the apparatus, ready to be lowered on to a railway truck (not shown) for example.

FIG. 3 shows another operative position, with the pedestal extended upwardly its maximum distance. In this position the apparatus is shown as having stacked two containers 9,9, one on the other, with the upper container supported from the beam 6. The latter is suspended from the carriages 4 (of which only one is visible) by the cables or chains 6A.

FIG. 4 shows another operative position, with the right-hand arm 3 folded down and inoperative, and the right-hand stabilizer 8,8A not fully extended. In this way the apparatus can be operated in a single-sided manner, for example when a load is to be moved to or from one side only. A container 9 is shown in process of being lifted from a position 9A on the ground to a position 9B on the vehicle. Operation in this manner is useful when the apparatus must be close to a wall 10.

FIG. 5 shows another operative position, in which the pedestal is not extended so high as in FIGS. 3 and 4. In this position the apparatus is being used to transfer a container 9 from a railway wagon 11 to a position 9B on a road vehicle 12.

Referring to FIGS. 1, 2 and 3, each trackway is formed in this embodiment by three flat plates 3A, 5B, 3A respectively on one arm 3, the top member 5, and the other arm 3. As can be seen in FIGS. 1 and 2, these plates project in the fore and aft directions slightly beyond the arms 3 and member 5, and the carriage 4 has upper wheels 4A (FIG. 3) which ride on top of the plates and lower wheels 4B which engage the undersides of the projecting portions of the plates.

The various structural members may be either simple box section members (for example the arms 3) or simple tubular or box section members (for instance the telescoping pillar members 2A). This, together with the simple turning movements of the arms 3 in vertical planes, permits a relatively simple and inexpensive construction, as compared with some complex prior art arrangements. Nevertheless, in spite of its relatively simple construction and operation, the load handling apparatus of the invention is versatile in that it can handle loads in various ways, some of which have been described above.

Other embodiments are possible within the scope of the invention as defined by the claims, for example the outriggers 8 may be housed in, or pass through, a tunnel or other opening in the pedestal.

I claim:
1. Load handling apparatus, including:
a road vehicle and load moving means on the vehicle for moving a load laterally of the vehicle, the load moving means being not greater in width than the width of the vehicle,
wherein the load moving means comprises:
two spaced load moving structures each of which has a vertically extendible pedestal;
each said pedestal having an upper vertically movable member;
each said load moving structure having at least one arm which in an operative position extends substantially horizontally outwardly from the respective said pedestal;
said at least one arm supporting a device for conveying a load in a direction laterally of the vehicle;
each said arm being turnable downwardly in a substantially vertical plane so that in said inoperative position thereof, such arm is disposed alongside a respective said pedestal;
each said upper vertically movable member having a horizontally extending top member;
each said arm being so pivotally mounted at an end of a corresponding said top member, that, in an operative position, each top member and each respective outwardly extending arm constitute a trackway; and
a respective carriage running on each said trackway.

2. Apparatus according to claim 1, wherein:
each arm is turnable in the respective said vertical plane by means of a ram connected at an upper end thereof to the respective said arm and at a lower end thereof to the respective said upper vertically movable member.

3. Apparatus according to claim 1, wherein:
a load carrying beam having two opposite ends extends lengthwise of the vehicle between said two pedestals and is suspended at each of said ends thereof from a respective said carriage for horizontal movement of said carriages and said beam laterally of said vehicle.

4. Apparatus according to claim 3, wherein:
each arm is turnable in the respective said vertical plane by means of a ram connected at an upper end thereof to the respective said arm and a lower end thereof to the respective said upper vertically movable member.

5. Apparatus according to claim 1, wherein:
each said pedestal is comprised of three telescopically-related tubular pillar members.

6. Apparatus according to claim 1, wherein:
each said trackway comprises top plates of both each respective said arm and of the respective said horizontally extending top member, which plates project in the fore and aft directions of the vehicle beyond each respective said arm and the respective said top member;
each said carriage having a plurality of wheels which engage upper and lower faces of the respective said plates.

* * * * *